United States Patent [19]

Petler

[11] Patent Number: 6,074,428
[45] Date of Patent: Jun. 13, 2000

[54] MINIMIZING LOGIC BY RESOLVING "DON'T CARE" OUTPUT VALUES IN A FINITE STATE MACHINE

[75] Inventor: Scott C. Petler, Rocklin, Calif.

[73] Assignee: Hewlett-Packard Company, Palo Alto, Calif.

[21] Appl. No.: 08/325,765

[22] Filed: Oct. 19, 1994

[51] Int. Cl.[7] ................................................ G06F 19/00
[52] U.S. Cl. .................................. 716/2; 716/15; 716/18
[58] Field of Search ..................... 341/106, 22; 327/216, 327/176; 710/73, 5; 714/15, 21, 39, 49; 700/95, 96, 97; 716/3, 15, 18

[56] References Cited

U.S. PATENT DOCUMENTS

| | | | |
|---|---|---|---|
| 4,727,548 | 2/1988 | Dickey | 371/49 |
| 4,752,928 | 6/1988 | Chapman et al. | 371/20 |
| 4,755,967 | 7/1988 | Gabris et al. | 364/900 |
| 4,862,347 | 8/1989 | Rudy | 395/500 |
| 5,063,536 | 11/1991 | Tinder et al. | 395/775 |
| 5,097,151 | 3/1992 | Erenstein et al. | 326/46 |
| 5,126,966 | 6/1992 | Hafeman et al. | 364/500 |
| 5,228,040 | 7/1993 | Agrawal et al. | 371/22.1 |
| 5,329,471 | 7/1994 | Swoboda et al. | 364/578 |
| 5,361,389 | 11/1994 | Fitch | 395/375 |
| 5,389,838 | 2/1995 | Orengo | 326/93 |
| 5,408,622 | 4/1995 | Fitch | 395/375 |
| 5,448,717 | 9/1995 | Balmer et al. | 395/550 |
| 5,450,598 | 9/1995 | Kaplan et al. | 395/800 |
| 5,452,215 | 9/1995 | Washabaugh | 364/468 |
| 5,459,462 | 10/1995 | Vankidu et al. | 341/22 |
| 5,461,573 | 10/1995 | Chakradhar et al. | 364/489 |
| 5,463,543 | 10/1995 | Wagner | 364/141 |
| 5,517,432 | 5/1996 | Chandra et al. | 364/578.1 |
| 5,542,034 | 7/1996 | Petler | 395/500 |
| 5,555,201 | 9/1996 | Dangelo et al. | 364/489 |

OTHER PUBLICATIONS

Steve Golson, State Machine Design Techniques for Verilog and VHDL, *Synopsys Journal of High–Level Design,* Sep. 1994, pp. 1–44.

*Primary Examiner*—Larry D. Donaghue

[57] ABSTRACT

Logic which implements an output encoded finite state machine is reduced by resolving "don't care" output values. Specifically, in order to generate logic for a finite state machine, input is received from a user. The input specifies states of the finite state machine, transition conditions between states and output values for each state. For example, a graphical user interface receives from the user a graphic portrayal of a state diagram. At least one output value is unspecified for at least one state. Logic for a finite state machine is generated from the user inputs. The generation includes, for each output of the finite state machine, generating an output flip-flop which stores the output. Values are assigned to unspecified output values. The assigned values are selected so that each state can be uniquely identified by current values stored by the output flip-flops and a minimum of additional flip-flops. For example, the assignment is done by determining a number of times output values between two states are identical for every combination of values for the unspecified output values. The combination of values which results in a minimum number of times output values between two states are identical is the combination of values assigned to the unspecified output values.

12 Claims, 5 Drawing Sheets

FIGURE 5 and# MINIMIZING LOGIC BY RESOLVING "DON'T CARE" OUTPUT VALUES IN A FINITE STATE MACHINE

BACKGROUND

The present invention relates generally to generation of logic for a finite state machine (FSM). More particularly, the invention concerns a method for reducing logic in a finite state machine by resolving "don't care" output values when generating logic for the finite state machine (FSM)

In many situations a finite state machine can be represented using standard building blocks, particularly, a next state decode block, state memory storage elements and an output decode block. Typically, the state memory storage elements are delay (D) flip-flops. The D flip-flops store an encoded value which indicates the current state of the finite state machine. The output decode block generates the FSM outputs based on the current state as determined from the encode value stored by the D flip-flops. Combinatorial logic in the next state decode block and the output decode block are reduced to limit the circuitry necessary to implement the finite state machine.

One problem with finite state machines with a structure which utilizes a next state decode block, state memory storage elements and an output decode block is that the outputs to the finite state machine may glitch as the outputs from the state memory storage elements propagate through the output decoder. To eliminate this problem, some designers opt for an alternate architecture which eliminates the output decode logic. In this case, the structure includes only the next state decode block and memory storage elements. The memory storage elements include a dedicated flip-flop for each FSM output. This eliminates the need for the output decode block.

In one variation of finite state machines without output decode blocks there are storage elements for each individual FSM output and, in addition, storage elements which encode the state. In this case the values of the storage elements for the individual FSM outputs are not fed back into the next state decode block to determine the current state.

In another variation of finite state machines without output decode blocks, there are storage elements for each individual FSM output, but there is not storage elements which encode the state. This type of finite state machine may be referred to as an output encoded finite state machine. The state of the output encoded finite state machine is determined by the next state decode block using the value of the FSM outputs. If each state has a unique combination of the values of the FSM outputs, the next state decode block is able to determine the current state using only the FSM outputs. When more than one state has the same combination of the values of the FSM outputs, the next state decode block is no longer able to determine the current state using only the FSM outputs. Therefore, one or more additional storage elements are added and assigned values so that each state has a unique combination of the values stored by all the storage elements, that is a combination of the values of both the FSM outputs and the outputs of the additional storage elements.

SUMMARY OF THE INVENTION

In accordance with the preferred embodiment of the present invention, logic which implements an output encoded finite state machine is reduced by resolving "don't care" output values. Specifically, in order to generate logic for a finite state machine, input is received from a user. The input specifies states of the finite state machine, transition conditions between states and output values for each state. For example, a graphical user interface receives from the user a graphic portrayal of a state diagram.

In the preferred embodiment of the present invention, at least one output value is unspecified for at least one state. That is, the user does not specify the output value for a particular state, but rather specifically indicates that the output value is a "don't care."

Logic for a finite state machine is generated from the user inputs. The generation includes, for each output of the finite state machine, generating an output flip-flop which stores the output. Values are assigned to unspecified output values. The assigned values are selected so that each state can be uniquely identified by current values stored by the output flip-flops and a minimum of additional flip-flops.

For example, the assignment is done by determining a number of times output values between two states are identical for every combination of values for the unspecified output values. The combination of values which results in a minimum number of times output values between two states are identical is the combination of values assigned to the unspecified output values.

The preferred embodiment of the present invention allows for the reduction of flip-flops required for implementation of an output encoded state machine.

DESCRIPTION OF THE PREFERRED EMBODIMENT

The preferred embodiment of the present invention is implemented within an engineering tool which generates a finite state machine (FSM) using a graphical user interface (GUI).

Figure 1:
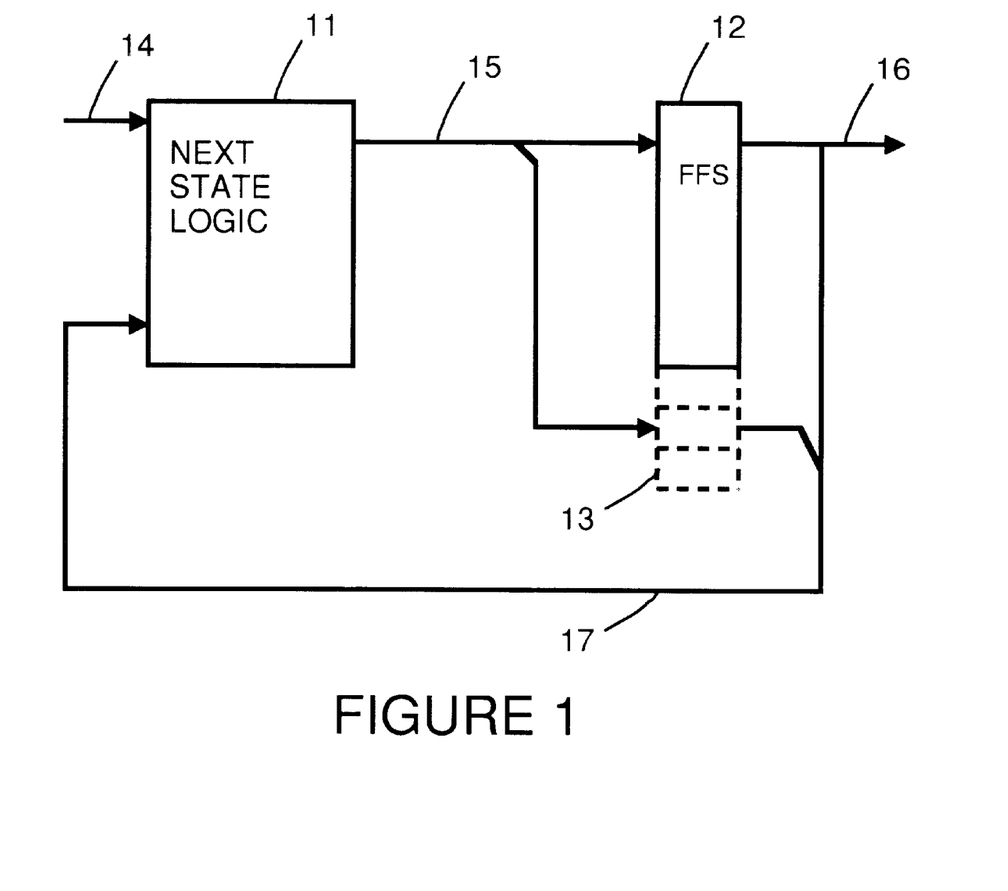
FIG. 1 shows a block diagram of an output encoded finite state machine.

For example, FIG. 1 shows a simplified block diagram of an output encoded finite state machine. Storage memory elements 12 include a series of delay (D) flip-flops, one D flip-flop for each of the FSM outputs 16. Additional storage memory elements 13 are additional D flip-flops which are added when needed to determine the current state of the finite state machine, as will be described further below.

A next state logic block 11 determines the next values 15 for storage elements 12 and storage elements 13 using inputs 14 and the current values 17 held in storage elements 12 and storage elements 13. The current state of the finite state machine shown in FIG. 1 is determined by the current values 17 held in storage elements 12 and storage elements 13. If each state has a unique combination of the values held in storage elements 12, storage elements 13 are eliminated from the finite storage elements. When more than one state has the same combination of the values held in storage elements 12, there are a sufficient number of storage elements within storage elements 13 so that each state has a unique combination of the current values 17.

Figure 2:
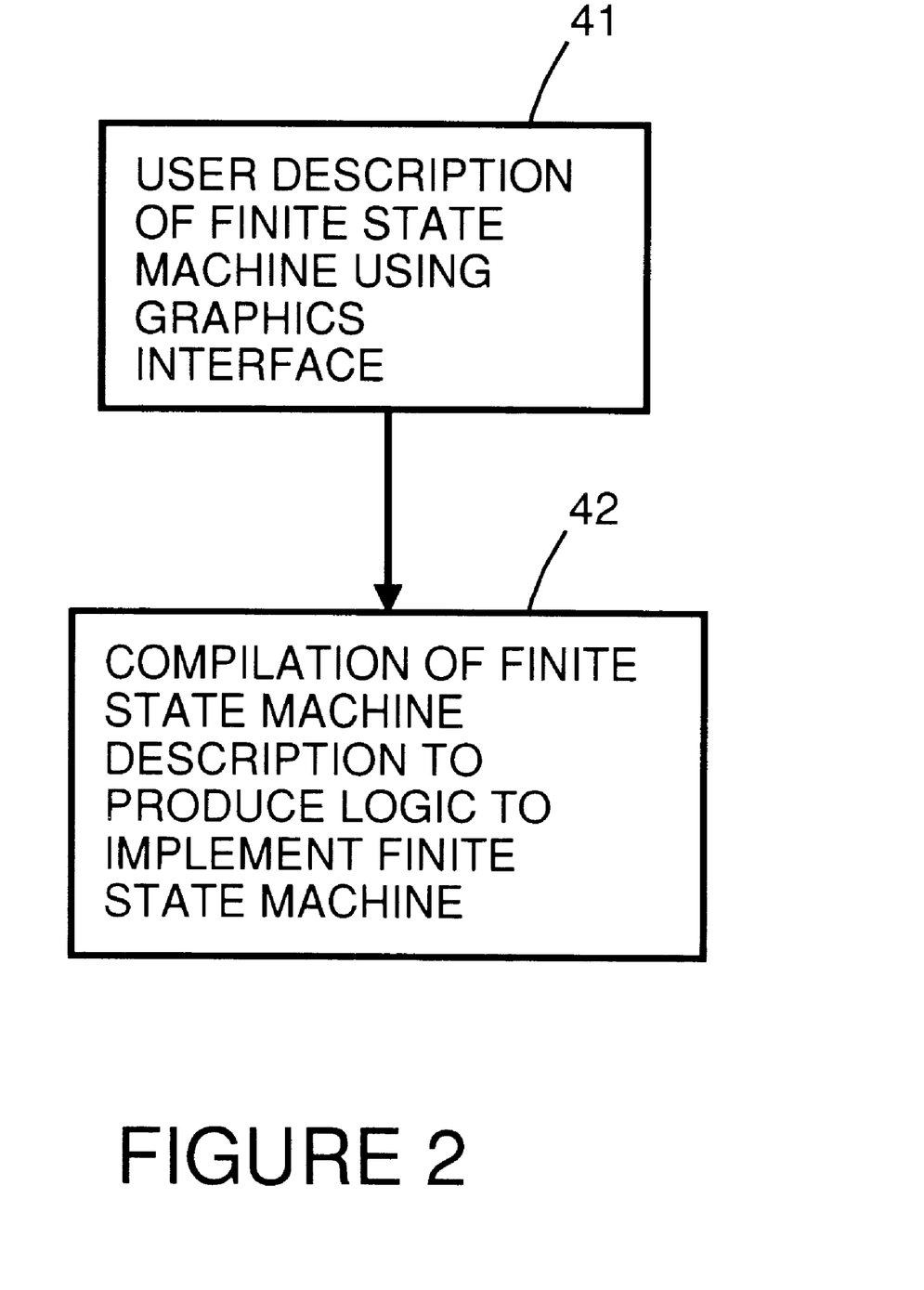
FIG. 2 is a simplified block diagram illustrating operation of a engineering tool used to produce an output encoded finite state machine in accordance with the preferred embodiment of the present invention.

FIG. 2 is a simplified block diagram illustrating operation of a engineering tool used to produce the output encoded finite state machine shown in FIG. 1. In a step 41, a user enters a user description of finite state machine using a graphical interface. The finite state machine description includes a state diagram for the finite state machine. Each state of the finite state machine is given a name. Additionally, the state diagram includes a list of output values in each of the states. The state diagram also contains conditions to transition to other states.

In the preferred embodiment of the present invention, a user may indicate that an output value is unspecified for a particular FSM state. That is, the user indicates an output value for a particular state is a "don't care" by placing a value of "X" for the output value at the particular state. This information is used to reduce the number of flip-flops in the resulting finite state machine.

In a step 42, the engineering tool compiles the finite state machine description entered by the user in step 41. The compilation produces logic which implements the finite state machine. For a general description of compilers which generate logic for finite state machines, see, for example, Steve Golson, *State Machine Design Techniques for Verilog and VHDL, Synopsys Journal of High-Level Design*, September 1994, pp. 1–44. See also, *Design Compiler Family Reference Manual*, Version 3.1A, available from Synopsys Co., March 1994, pp. 10-1 through 10-38.

Figure 3:
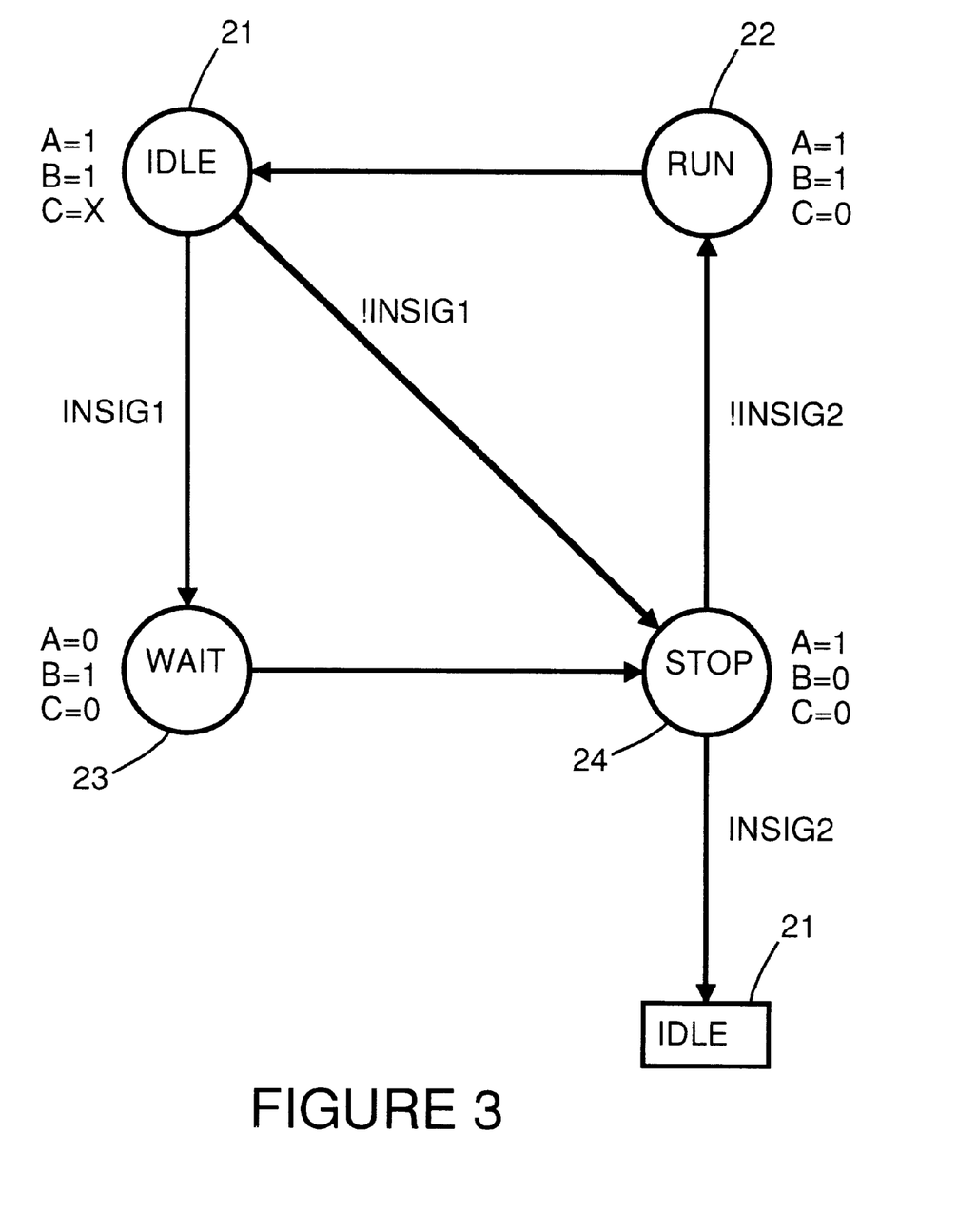
FIG. 3 shows a state diagram for a finite state machine in accordance with the preferred embodiment of the present invention.

FIG. 3 shows an example of a state diagram for a finite state machine entered by a user in step 41. The state diagram includes four FSM states, an idle state 21, a run state 22, a wait state 23 and a stop state 24. In idle state 21, an output A has a value of 1, an output B has a value of 1, and an output C has a value of X. The value of X for output C indicates that in idle state 21, the value of output C is a "don't care." In run state 22, output A has a value of 1, output B has a value of 1, and output C has a value of 0. In wait state 23, output A has a value of 0, output B has a value of 1, and output C has a value of 0. In stop state 24, output A has a value of 1, output B has a value of 0, and output C has a value of 0.

In idle state 21, when an input value INSIG1 is asserted, on a next clock cycle, the finite state machine transitions to wait state 23. In idle state 21, when input value INSIG1 is de-asserted, on a next clock cycle, the finite state machine transitions to stop state 24. In run state 21, on a next clock cycle, the finite state machine transitions to idle state 21. In wait state 23, on a next clock cycle, the finite state machine transitions to stop state 24. In stop state 24, when an input value INSIG2 is asserted, on a next clock cycle, the finite state machine transitions to idle state 21. In stop state 24, when an input value INSIG2 is de-asserted, on a next clock cycle, the finite state machine transitions to run state 22.

The use of "don't care" values in the state diagrams allows use of the designers knowledge that in some FSM states of the finite state machine, the value of certain outputs is irrelevant to proper operation of the finite state machine. This allows the engineering tool to attempt a reduction in the number of flip-flops needed to implement the finite state machine. As discussed above, in an output encoded finite state machine with a certain number of FSM states with identical outputs, a certain number of flip-flops need to be added so that every FSM state can be uniquely identified. With the addition of the don't care information it is possible that the output can be assigned unique values which lessens the number of FSM states with identical outputs, thus reducing the number of flip-flops required to implement the finite state machine.

Figure 4:
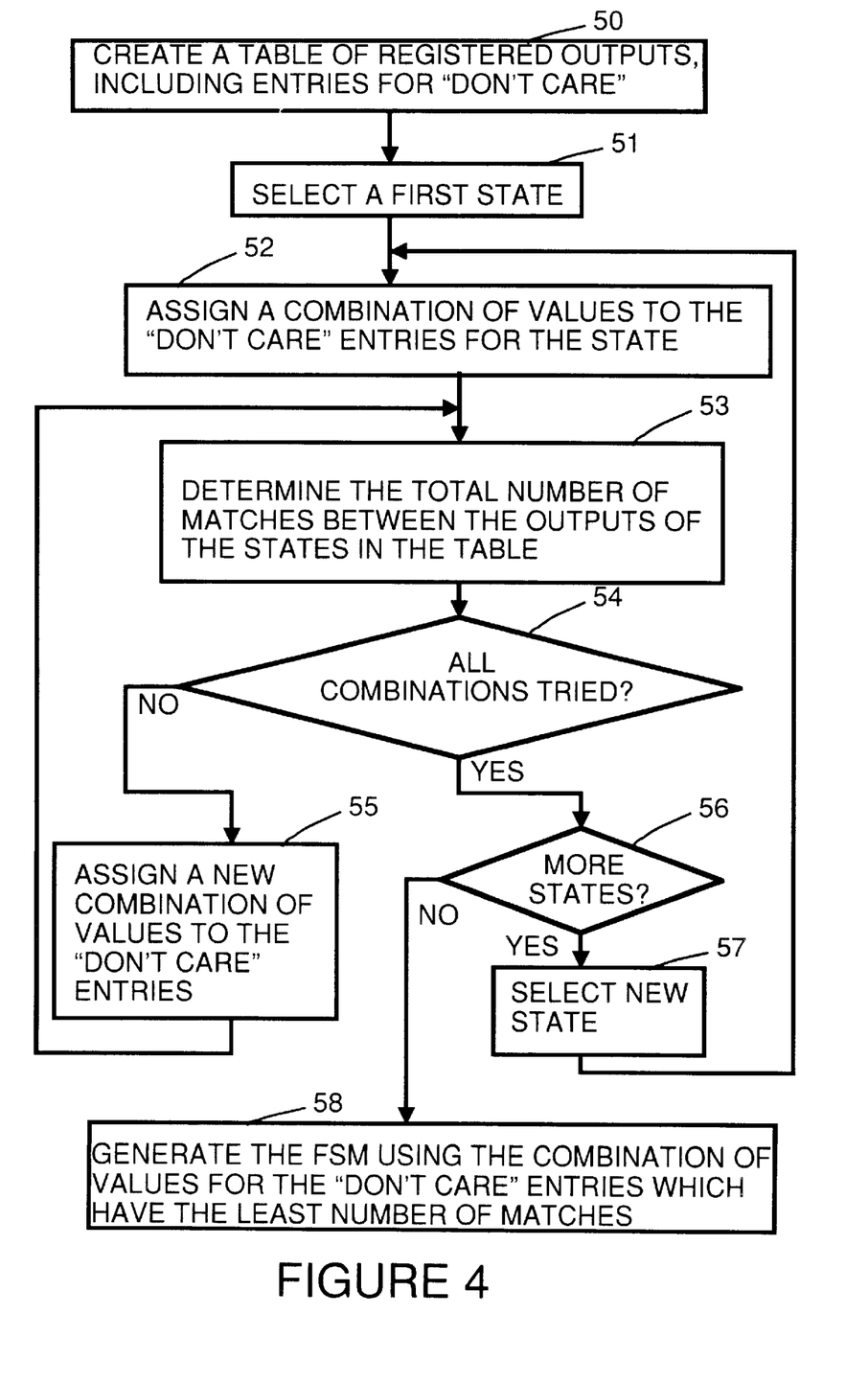
FIG. 4 shows a flow chart which describes resolution of "don't care" output values in the generation of a finite state machine in accordance with the preferred embodiment of the present invention.

FIG. 4 shows a flow chart which describes resolution of "don't care" output values in the generation of a finite state machine in accordance with the preferred embodiment of the present invention. In a step 50, a table of registered outputs is created. The table includes entries for "don't care" output values.

In a step 51, a first state which has a "don't care" entry is selected. In a step 52, a combination of values is assigned to the "don't care" entries for the state. In a step 53, using the combination of values assigned in step 52, the total number of matches between the outputs of the FSM states in the table is determined. A match occurs whenever two FSM states have identical output values. For the "don't care" entries in the states which have not yet been resolved, these are regarded as matches.

In a step 54, a determination is made as to whether all combinations have been tried. If not, in a step 55, a new combination of values is assigned to the "don't care" entries for the state. When it is determined in step 54 that all combinations have been tried, in a step 56, it is determined whether there are more states which have a "don't care" entry. If so, in a step 57, a new state with a "don't care" entry is selected and then steps 52 through 56 are repeated for this state. If in step 56 it is determined that there are no more states with "don't care" entries, in a step 58, the finite state machine is generated using the combination of values for the "don't care" entries for each state which resulted in the least number of matches.

For example, consider the state diagram shown in FIG. 3. The table created in step 50 has, for example, the form of Table 1 below:

TABLE 1

| | Output Values | | |
|---|---|---|---|
| FSM State | A | B | C |
| IDLE | 1 | 1 | X |
| RUN | 1 | 1 | 0 |
| WAIT | 0 | 1 | 0 |
| STOP | 1 | 0 | 0 |

In step 51, idle state 21 is selected. In step 52, a combination of values is assigned to the "don't care" entries for the IDLE state. In this case there is only one "don't care" entry. That is the output value C for idle state 21. In the first iteration, the output value C for idle state is selected to be 0. The result is shown in Table 2 below:

TABLE 2

| | Output Values | | |
|---|---|---|---|
| FSM State | A | B | C |
| IDLE | 1 | 1 | 0 |
| RUN | 1 | 1 | 0 |
| WAIT | 0 | 1 | 0 |
| STOP | 1 | 0 | 0 |

In step 53, using the combination of values assigned in step 52, the total number of matches between the outputs of the FSM states in the table is determined. In this case, there is a match of output values between idle state 21 and run state 22. Thus, the total number of matches is one.

In step 54, it is determined there is still a combination that has not been tried. Thus in step 55, a new combination of values is assigned to the "don't care" entries. That is, the output value C for idle state is selected to be 1. The result is shown in Table 3 below:

TABLE 3

| FSM State | Output Values | | |
|---|---|---|---|
| | A | B | C |
| IDLE | 1 | 1 | 1 |
| RUN | 1 | 1 | 0 |
| WAIT | 0 | 1 | 0 |
| STOP | 1 | 0 | 0 |

In step 53, using the combination of values assigned in step 55, the total number of matches between the outputs of the FSM states in the table is determined. In this case, there are no matches. Thus, the total number of matches is zero.

In state 56, it is determined there are no more states with "don't care" entries. In step 58, the finite state machine is generated using the combination of values for the "don't care" entries which resulted in the least number of matches. That is, the finite state machine is generated so that in the idle state, the output value of C is 1.

Figure 5:
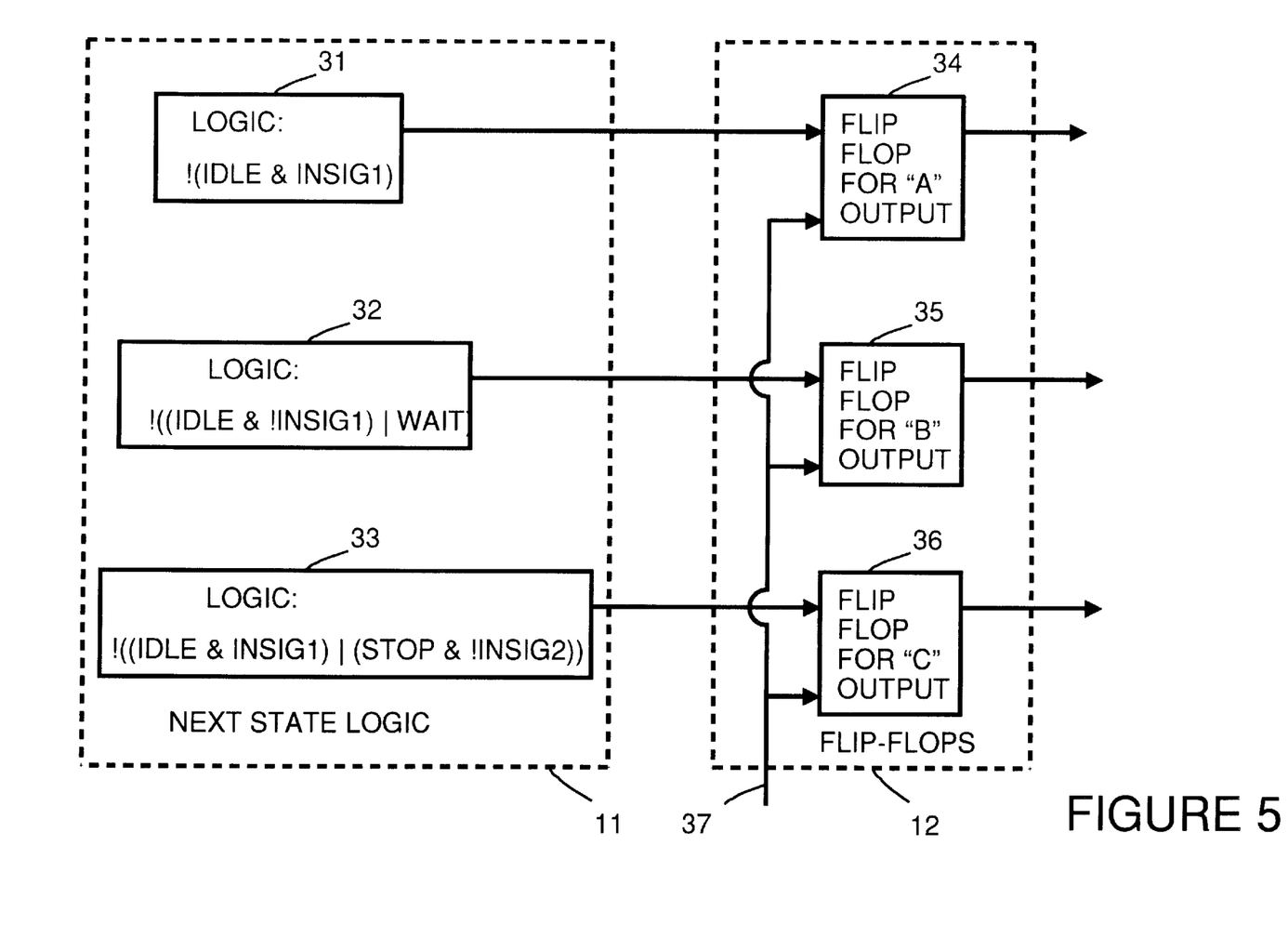
FIG. 5 shows a simplified block diagram of a finite state machine generated from the state diagram shown in FIG. 3 using the methodology described in the flow chart shown in FIG. 4 in accordance with the preferred embodiment of the present invention.

FIG. 5 shows a resulting implementation of a finite state machine. Since each FSM state has a unique set of output values, the finite state machine requires only three flip flops. Thus storage memory elements 12 includes a D flip flop 34 for the A output, a D flip flop 35 for the B output and a D flip flop 36 for the C output. A clock line 37 is also shown. There is no need for additional storage elements 13.

Next state logic 11 includes logic 31 to generate an input to D flip-flop 34, logic 32 to generate an input to D flip-flop 35 and logic 33 to generate an input to D flip-flop 36. Logic 31 performs the following logic operation:

NOT(IDLE AND INSIG1).

As will be understood from the information discussed above, INSIG1 is an input value, and IDLE is determined from the output values listed in Table 3 above as being equal to:

A AND B AND C.

Logic 32 performs the following logic operation:

NOT((IDLE AND (NOT INSIG1)) OR WAIT).

As will be understood from the information discussed above, WAIT is determined from the output values listed in Table 3 above as being equal to:

(NOT A) AND B AND (NOT C).

Logic 33 performs the following logic operation:

NOT((IDLE AND INSIG1) OR (STOP AND NOT(INSIG2))).

As will be understood from the information discussed above, INSIG2 is an input value, and STOP is determined from the output values listed in Table 3 above as being equal to:

A AND (NOT B) AND (NOT C).

As will be understood by persons of ordinary skill in the art, using Boolean Logic reduction techniques may be used to reduce logic when generating logic gate implementation of next state logic 11. Also, see co-pending U.S. patent application Ser. No. 08/325,916 for MINIMIZING LOGIC TO DETERMINE CURRENT STATE IN AN OUTPUT ENCODED FINITE STATE MACHINE, by Scott C. Petler, the subject matter of which is incorporated by reference.

The advantage of the present invention can be understood by comparing the logic structure required to implement the same finite state machine where the output value C for idle state is selected to be 0.

In that case, shown in Table 2, idle state 21 and run state 22 have the same set of output values. Therefore, the finite state machine requires an additional "Q0" flip-flop. Table 2 may be modified to take into account the additional Q0 flip-flop as set out in Table 4 below:

TABLE 4

| FSM State | Output Values | | | Extra FF |
|---|---|---|---|---|
| | A | B | C | Q0 |
| IDLE | 1 | 1 | 0 | 0 |
| RUN | 1 | 1 | 0 | 1 |
| WAIT | 0 | 1 | 0 | 0 |
| STOP | 1 | 0 | 0 | 0 |

As may be seen from Table 4, with the addition of Q0 flip-flop, each state may be uniquely determined from the values listed in Table 4.

When implementing the finite state machine, storage memory elements 12 still includes a D flip flop 34 for the A output, a D flip flop 35 for the B output and a D flip flop 36 for the C output. However, additional storage elements 13 will include the additional Q0 flip-flop.

Logic 31 will still perform the following logic operation:

NOT(IDLE AND INSIG1).

Logic 32 will still perform the following logic operation:

NOT((IDLE AND (NOT INSIG1)) OR WAIT).

Logic 33 will be modified to perform the following logic operation:

(IDLE AND (NOT INSIG1)) OR WAIT.

Additional logic will be added to next state logic 11 in order to generate an input to the Q0 flip-flop. The additional logic will perform the following logic operation:

STOP AND (NOT INSIG2)

The present invention, therefore, allows for the elimination of a flip-flop and the logic which provides input to the additional flip-flop.

In the given example, there was only one "don't care" output value so there were only two combinations of assigned values. An increase in the number of "don't care" output values will increase the number of combinations to be tried. For example, Table 5 below shows a finite state machine which has two "don't care" output values.

TABLE 5

| FSM State | Output Values | | |
|---|---|---|---|
| | A | B | C |
| IDLE | 1 | 1 | $X_1$ |
| RUN | 1 | 1 | 0 |

TABLE 5-continued

| FSM State | Output Values | | |
|---|---|---|---|
| | A | B | C |
| WAIT | 0 | $X_2$ | 0 |
| STOP | 1 | 0 | 0 |

For this example, in step 51, idle state 21 is selected. In step 52, a combination of values is assigned to the "don't care" entries for the IDLE state. In this case there is only one "don't care" entry. That is the output value C for idle state 21. In the first iteration, the output value C for idle state is selected to be 0. The result is shown in Table 6 below:

TABLE 6

| FSM State | Output Values | | |
|---|---|---|---|
| | A | B | C |
| IDLE | 1 | 1 | 0 |
| RUN | 1 | 1 | 0 |
| WAIT | 0 | $X_2$ | 0 |
| STOP | 1 | 0 | 0 |

In step 53, using the combination of values assigned in step 52, the total number of matches between the outputs of the FSM states in the table is determined. Because the value of output value B for wait state 23 has not been resolved, when comparing the output values of wait state 23 with the output values of other states, the value for output value B will be presumed to always be a match. That is, when determining the number of matches, output value B in wait state 23 is presumed to be a "1" when wait state 23 is compared with idle state 20 and run state 21, and output value B in wait state 23 is presumed to be a "0" when wait state 23 is compared with stop state 24.

In step 53, a match of output values between idle state 21 and run state 22 is detected. Thus, the total number of matches is one.

In step 54, it is determined there is still a combination that has not been tried. Thus in step 55, a new combination of values is assigned to the "don't care" entries. That is, the output value C for idle state is selected to be 1. The result is shown in Table 7 below:

TABLE 7

| FSM State | Output Values | | |
|---|---|---|---|
| | A | B | C |
| IDLE | 1 | 1 | 1 |
| RUN | 1 | 1 | 0 |
| WAIT | 0 | $X_2$ | 0 |
| STOP | 1 | 0 | 0 |

In step 53, using the combination of values assigned in step 55, the total number of matches between the outputs of the FSM states in the table is determined. Again, because output value B in wait state 23 is unresolved, when determining the number of matches, output value B in wait state 23 is presumed to be a "1" when wait state 23 is compared with idle state 20 and run state 21, and output value B in wait state 23 is presumed to be a "0" when wait state 23 is compared with stop state 24. In this case, there are no matches. Thus, the total number of matches is zero.

In state 56, it is determined that wait state 23 still has a "don't care" entries. Thus steps 52 through 56 are repeated to resolve the value of output value B of wait state 23. When resolving the value of the output value B of wait state 23, the value of output value C will be presumed to be "1" when comparing the output values of idle state 20 with the output values of other states. This is because, in the previous iteration, the value of output value C for idle state 20 was resolved.

As a result of executing steps 52 through 56, regardless of the value assigned to output value B of wait state 23, there are no matches. Therefore, the value of output value B may be assigned to be either a 0 or a 1.

In step 58, the finite state machine is generated using the combination of values for the "don't care" entries which resulted in the least number of matches. That is, the finite state machine is generated so that in idle state 21, the output value of C is 1 and in wait state 23 the output value of B is 0 (or 1 depending upon the chosen default).

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A method for generating logic for a finite state machine, the method comprising the steps of:

(a) receiving, from a user, input which specifies states of the finite state machine, transition conditions between states and output values for each state, wherein at least one output value is unspecified for at least one state; and, (b) generating logic for a finite state machine from the inputs received in step (a) including, for each output of the finite state machine, generating an output flip-flop which stores the output, the generating of the logic including the following substep (b.1) assigning values to unspecified output values so that each state can be uniquely identified by current values stored by the output flip-flops and a minimum of additional flip-flops.

2. A method as in claim 1 wherein substep (b.1) includes performing the following substeps for each state with at least one unspecified output value:

(b.1.1) determining a number of times output values between two states are identical for every combination of values for the unspecified output values in the state; and, (b.1.2) assigning a first combination of values to the unspecified output values in the state, the first combination of values being determined in substep (b.1.1) to result in a minimum number of times output values between two states are identical.

3. A method as in claim 1 wherein step (a) includes using a graphical user interface to receive the input, the input including a graphic portrayal of a state diagram.

4. An engineering design tool which generates logic for a finite state machine, the engineering design tool comprising:

input means for receiving from a user input which specifies states of the finite state machine, transition conditions between states and output values for each state, wherein at least one output value is unspecified for at least one state; and compilation means for generating logic for a finite state machine from the states of the finite state machine, the transition conditions between the states and the output values for each state, as received by the input means, the compilation means, for each output of the finite state machine, generating an output flip-flop which stores the output, wherein the compilation means includes assigning means for assigning values to unspecified output values so that each state can be uniquely identified by current values stored by the output flip-flops and a minimum of additional flip-flops.

5. An engineering design tool as in claim 5 wherein the assigning means determines a number of times output values between two states are identical for every combination of values for the unspecified output values and assigns a first combination of values to the unspecified output values, the first combination of values being determined to result in a minimum number of times output values between two states are identical.

6. An engineering tool as in claim 4 wherein the input means comprises a graphical user interface, and wherein the user input which specifies states of the finite state machine, transition conditions between states and output values for each state is in the form of a state diagram.

7. A method for generating logic for a finite state machine comprising the step of:

(a) generating logic for a finite state machine from a specification of the finite state machine, the specification including a specification of states of the finite state machine, transition conditions between states and output values for each state, including the following substeps:

(a.1) for each output of the finite state machine, generating an output flip-flop which stores the output, and (a.2) when there is at least one state for which an output value is not specified, assigning values to unspecified output values so that each state can be uniquely identified by current values stored by the output flip-flops generated in step (a.1) and a minimum of additional flip-flops.

8. A method as in claim 7 wherein substep (a.2) additionally comprises the following substeps:

(a.2.1) temporarily assigning combinations of values to the unspecified output values;

(a.2.2) for each combination of values assigned in substep (a.2.1), determining a number of times output values between two states are identical; and, (a.2.3) permanently assigning a first combination of values to the unspecified output values, the first combination of values being determined in substep (a.2.2) to result in a minimum number of times output values between two states are identical.

9. A method as in claim 7 wherein substep (a.2) additionally comprises the following substeps:

(a.2.1) for every combination of values for the unspecified output values, determining a number of times output values between two states are identical; and, (a.2.2) assigning a first combination of values to the unspecified output values, the first combination of values being determined in substep (a.2.1) to result in a minimum number of times output values between two states are identical.

10. A method as in claim 7 additionally comprising the following step performed before step (a):

(b) generating the specification for the finite state machine using a graphical user interface, the graphical user interface generating the specification of the finite state machine from a graphic representation of a state diagram for the finite state machine input by a user.

11. A method for generating logic for a finite state machine, the method comprising the steps of:

(a) receiving, from a user, input which specifies states of the finite state machine, transition conditions between states and output values for each state, wherein at least one output value is unspecified for at least one state; and, (b) generating logic for a finite state machine from the inputs received in step (a) including, for each output of the finite state machine, generating an output flip-flop which stores the output, the generating of the logic including the following substep (b.1) assigning values to unspecified output values so that each state can be uniquely identified by current values stored by the output flip-flops and a minimum of additional flip-flops, including performance of the following substeps for each state with at least one unspecified output value:

(b.1.1) determining a number of times output values between two states are identical for every combination of values for the unspecified output values in the state, wherein when performing substep (b.1.1) for every combination of values for the unspecified output values in a first state, performing the following substeps:

(b.1.1.1) for a second state for which a combination of values has been assigned to unspecified values in the second state, using the assigned combination of values assigned to unspecified values in the second state when determining the number of times output values between two states are identical for every combination of values for the unspecified output values in the first state, and (b.1.1.2) for a third state for which a combination of values has not been assigned to unspecified values in the third state, when comparing the output values of the third state with another state, always presuming the unspecified values in the third state match corresponding values with the other state when determining the number of times output values between two states are identical for every combination of values for the unspecified output values in the first state, and (b.1.2) assigning a first combination of values to the unspecified output values in the state, the first combination of values being determined in substep (b.1.1) to result in a minimum number of times output values between two states are identical.

12. A method for generating logic for a finite state machine comprising the step of:

(a) generating logic for a finite state machine from a specification of the finite state machine, the specification including a specification of states of the finite state machine, transition conditions between states and output values for each state, including the following substeps:

(a.1) for each output of the finite state machine, generating an output flip-flop which stores the output, and (a.2) when there is at least one state for which an output value is not specified, assigning values to unspecified output values so that each state can be uniquely identified by current values stored by the output flip-flops generated in step (a.1) and a minimum of additional flip-flops, including the following substeps:

(a.2.1) for every combination of values for the unspecified output values, determining a number of times output values between two states are identical, wherein when performing substep (a.2.1) for every combination of values for the unspecified output values in a first state, performing the following substeps:

(a.2.1.1) for a second state for which a combination of values has been permanently assigned to unspecified values in the second state, using the permanently assigned combination of values permanently assigned to unspecified values in the second state when determining the number of times output values between two states are identical for every combination of values for the unspecified output values in the first state, and (a.2.1.2) for a third state for which a combination of values has not been permanently assigned to unspecified values in the third state, when comparing the output values of the third state with another state, always presuming the unspecified values in the third state match corresponding values with the other state when determining the number of times output values between two states are identical for every combination of values for the unspecified output values in the first state, and (a.2.2) assigning a first combination of values to the unspecified output values, the first combination of values being determined in substep (a.2. 1) to result in a minimum number of times output values between two states are identical.

* * * * *